United States Patent [19]
Yamada

[11] Patent Number: 5,625,672
[45] Date of Patent: Apr. 29, 1997

[54] APPARATUS AND METHOD FOR PROVIDING A MICROZONE MOBILE COMMUNICATION SYSTEM WITHIN A CELLULAR TELEPHONE SYSTEM

[75] Inventor: Jun Yamada, Yokohama, Japan

[73] Assignee: Matsushita Electric Industrial Co., Ltd., Osaka, Japan

[21] Appl. No.: 209,594

[22] Filed: Mar. 10, 1994

Related U.S. Application Data

[63] Continuation of Ser. No. 796,808, Nov. 25, 1991, abandoned.

[30] Foreign Application Priority Data

Nov. 29, 1990 [JP] Japan ................................. 2-333843

[51] Int. Cl.⁶ ........................................... H04Q 7/00
[52] U.S. Cl. ........................ 379/59; 455/33.1; 455/33.4
[58] Field of Search ............................... 379/56, 58, 59, 379/60, 57; 455/13.1, 19, 33.1, 34.1, 73, 33.4

[56] References Cited

U.S. PATENT DOCUMENTS

| | | |
|---|---|---|
| 4,768,220 | 8/1988 | Yoshihara et al. . |
| 4,790,000 | 12/1988 | Kinoshita ............................ 379/59 |
| 4,792,984 | 12/1988 | Matsuo . |
| 4,850,033 | 7/1989 | Eizenhofer et al. . |
| 4,989,230 | 1/1991 | Gillig et al. . |
| 5,040,238 | 8/1991 | Comroe et al. . |
| 5,056,109 | 10/1991 | Gilhousen et al. . |
| 5,067,147 | 11/1991 | Lee . |
| 5,095,529 | 3/1992 | Comroe et al. . |
| 5,101,500 | 3/1992 | Marui . |
| 5,127,042 | 6/1992 | Gillig et al. . |
| 5,152,002 | 9/1992 | Leslie et al. . |
| 5,179,720 | 1/1993 | Grube et al. . |
| 5,193,101 | 3/1993 | McDonald et al. ................. 375/1 |
| 5,193,109 | 3/1993 | Lee . |
| 5,197,093 | 3/1993 | Knuth et al. . |
| 5,203,015 | 4/1993 | George . |
| 5,212,805 | 5/1993 | Comroe et al. ................... 455/33.1 |
| 5,237,603 | 8/1993 | Yamagata et al. . |
| 5,257,400 | 10/1993 | Yoshida . |
| 5,257,401 | 10/1993 | Dahlin et al. . |
| 5,260,988 | 11/1993 | Schellinger et al. . |
| 5,276,730 | 1/1994 | Cimini, Jr. et al. ................. 379/60 |
| 5,303,287 | 4/1994 | Laborde ............................. 379/59 |
| 5,390,235 | 2/1995 | Beasley ............................. 379/60 |
| 5,402,467 | 3/1995 | Watanabe ........................... 379/57 |
| 5,402,523 | 3/1995 | Berg ................................ 455/33.4 |

FOREIGN PATENT DOCUMENTS

| | | | |
|---|---|---|---|
| 0418096A2 | 9/1990 | European Pat. Off. . | |
| 1309528 | 12/1989 | Japan ................................. 379/60 |
| 1309527 | 12/1989 | Japan ................................. 379/60 |
| 2126736 | 5/1990 | Japan ................................. 379/60 |
| 2193425 | 7/1990 | Japan ................................. 379/60 |
| 2234649 | 2/1991 | United Kingdom ................... 379/60 |
| 2242806 | 10/1991 | United Kingdom ................... 379/60 |
| 2252699 | 8/1992 | United Kingdom ................... 379/60 |
| 2253968 | 9/1992 | United Kingdom . | |
| 2255474 | 11/1992 | United Kingdom . | |
| 2255476 | 11/1992 | United Kingdom . | |
| WO86/06915 | 11/1986 | WIPO . | |

OTHER PUBLICATIONS

Japanese Abstract No. 58-151136 dated Sep. 8, 1993.

*Primary Examiner*—William Cumming
*Attorney, Agent, or Firm*—Amster, Rothstein & Ebenstein

[57] ABSTRACT

A mobile communication system permits a mobile terminal to operate in a microzone system which services a local area and to also operate in a cellular telephone system which is available in the local area. The microzone telephone system uses the same frequency band and channels of the cellular telephone system and includes a monitoring receiver which monitors the channels within that frequency band and makes those channels which are less likely to interfere with the cellular telephone system available to the microzone system. The microzone system includes a portable terminal which is capable of accessing the cellular system and, when in range of the microzone system, capable of accessing the microzone system on idle ones of the cellular channels which have been made available to the microzone system.

7 Claims, 4 Drawing Sheets

APPARATUS AND METHOD FOR PROVIDING A MICROZONE MOBILE COMMUNICATION SYSTEM WITHIN A CELLULAR TELEPHONE SYSTEM

This is a continuation of application Ser. No. 07/796,808 filed on Nov. 25, 1991, now abandoned.

BACKGROUND OF THE INVENTION

The present invention relates to a mobile communication system which utilizes a radio scheme to secure communication lines for mobile-terminals moving in a wide area.

Typically, a cellular mobile telephone system has hitherto been utilized as this type of mobile communication system.

In the cellular mobile telephone system having a construction as schematically shown in FIG. 1, a terminating call from a public service telephone network (hereinafter abbreviated as PSTN) 101 to a mobile load or terminal (hereinafter abbreviated as ML) 102 once enters a mobile telephone switching office (hereinafter abbreviated as HTSO) 103 and the HTSO 103 causes a base station (hereinafter abbreviated as BS) 104 serving under the MTSO to call the ML 102 of interest. When this ML 102 responds, the MTSO 103 allots a radio channel between the ML 102 and the BS 104 covering the cellular zone in which the ml 102 exists to establish a communication line. In the case of an originating call from the ML 102, the MTSO 103 similarly allots a radio channel between the ML 102 and the BS 104.

Generally, the BS 104 has previously been assigned a predetermined number of radio channels and a channel for communication with the ML 102 is selected from unused radio channels in advance of communication with the ML 102.

In the cellular car telephone system, the service area is divided into small zones each having a BS and the same frequency can be used repetitively for BS's 104 which are so remote from each other that no interference disturbance takes place therebetween, to cover a wide area by taking advantage of highly efficient utilization of frequency. Therefore, this type of system is widely employed in many countries.

Especially, miniaturization of mobile loads or terminals has recently been developed remarkably to promote the number of portable terminals utilizing the cellular mobile telephone system and concurrent cost reduction of terminals drastically increases the number of users.

To comply with the rapidly increasing demand, division of the radio channel interval on the frequency axis, digitization ordering about highly efficient modulation techniques and highly efficient voice coding techniques and the like are adopted with a view of increasing the subscriber's capacity.

In essentiality, however, the cellular mobile telephone system faces the following problems and therefore expansion of the service area and subscriber's capacity cannot proceed infinitely but is limited to a given extent.

1-1 Basically, line design is conducted on the presupposition of outdoor services and, in buildings and underground district, there occurs an area in which services are difficult to offer.

1-2 For increasing the subscriber's capacity in a certain area, division of a zone of interest is the most effective approach (generally called "cell split"). In this case, there needs a great deal of economical and labor burden as exemplified by line design consideration for establishment of new neighboring base stations, change of assignment of radio channels to base stations and investigation of service area.

1-3 When the radius of a zone subject to cell split is reduced in the extreme, the probability that a moving mobile terminal deviates from the zone increases to increase communication processing traffic within the MTSO such as hand-over and the overall performance of the system falls off. Therefore, the zone radius is considered to be limited to several of hundreds meters.

Especially, widespread use of portable terminals has recently grown conspicuously and the communication base capable of offering personal communication has been demanded. Only the cellular mobile telephone system is however insufficient in providing such capability in to pass an area in which the density of population of pedestrians is high is desired to be covered while supporting loads or terminals moving at high speeds in a wide area.

SUMMARY OF THE INVENTION

The present invention contemplates elimination of the aforementioned problems and its object is to provide a mobile communication system capable of increasing the capacity of accommodation of mobile terminals and expanding, with flexibility and ease, an area in which the mobile terminals can receive services.

According to the invention, to accomplish the above object, a cellular telephone system and a microzone system are provided which have in common the same frequency band comprised of a plurality of radio channels, and mobile terminals are provided each of which can access any one of the above systems through manual or automatic switching.

Accordingly, in accordance with the invention, since the mobile terminal can access either the cellular telephone system or the microzone system through manual or automatic switching, a load of a low-speed mobile terminal accessing the cellular telephone system can be distributed to the microzone system, whereby the capacity of accommodation of mobile terminals can be increased by using the same frequency band for the microzone system and cellular telephone system and the area in which the mobile terminals receive services can be expanded with flexibility and ease.

DESCRIPTION OF THE PREFERRED EMBODIMENTS

Figure 1:
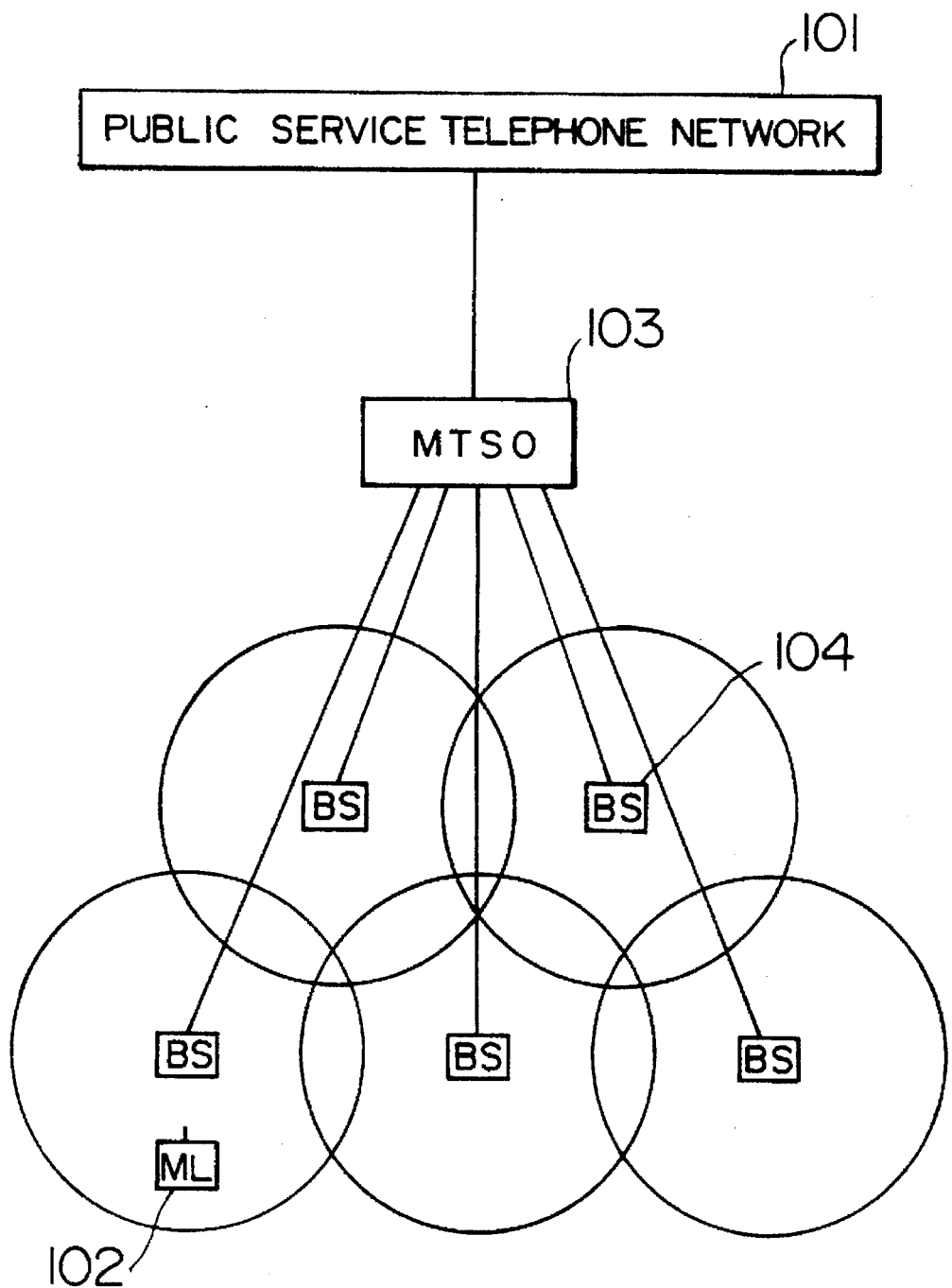
FIG. 1 is a conceptual diagram showing the construction of the prior art cellular mobile telephone system.
Figure 2:
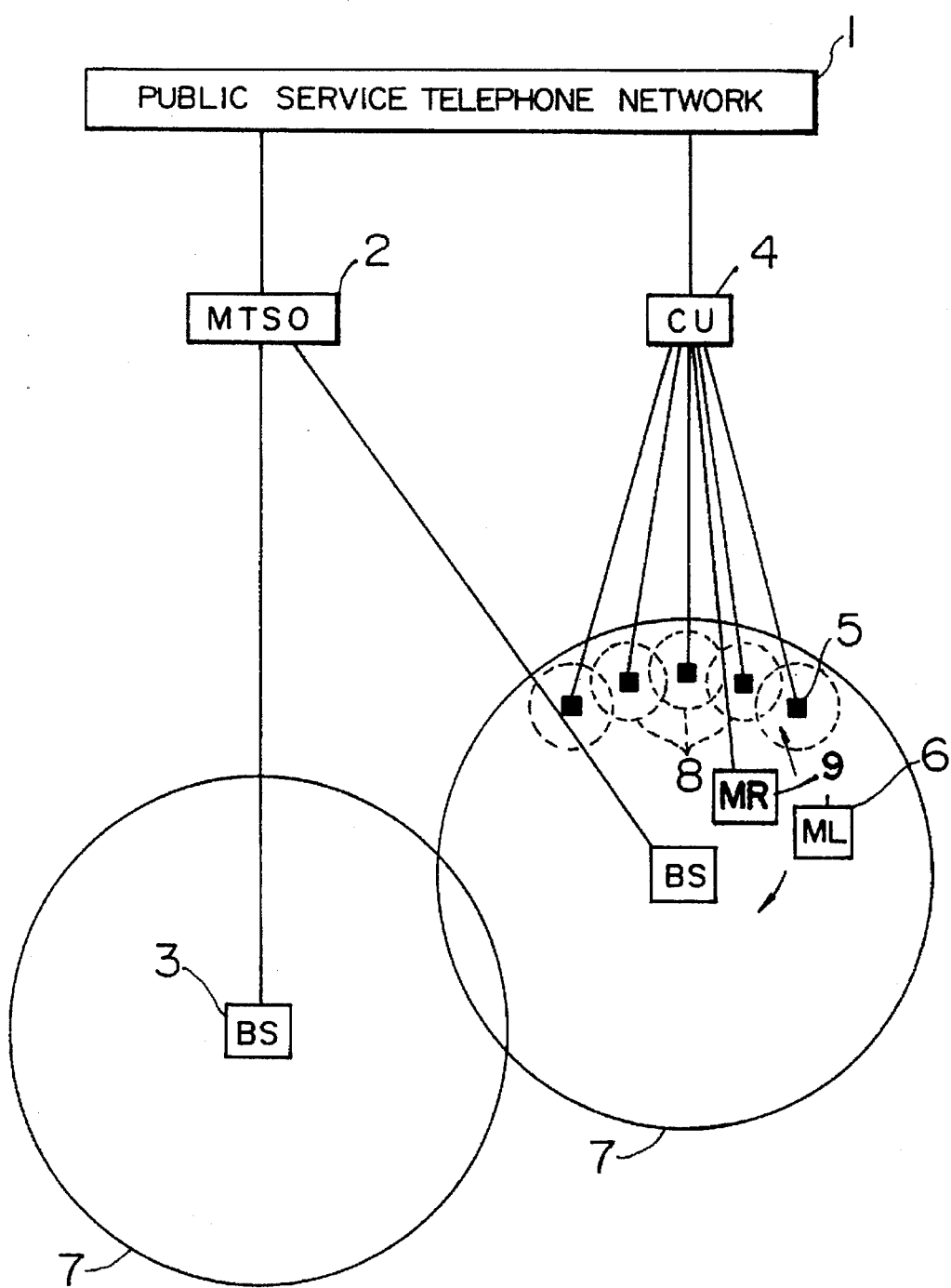
FIG. 2 is a schematic diagram showing a mobile communication system according to an embodiment of the invention.

An embodiment of the invention will now be described with reference to the accompanying drawings. FIG. 2 shows a system construction to which the invention is applied. A cellular mobile telephone system comprises a MTSO (mobile telephone switching office) 2 connectable to a PSTN (public service telephone network) 1 and a plurality of BS's 3 connectable to the MTSO 2.

A microzone system comprises a control unit (hereinafter abbreviated as CU) 4 connectable to the PSTN 1 and a plurality of fixed stations (hereinafter abbreviated as FS's) 5. Under the control of the CU 4 or under self-control judgment, the FS 5 selects a radio channel which is less apt to interfere with the cellular mobile telephone system and allots the selected radio channel to this station and a ML 6 which is an object of communication.

In the figure, a solid-line circle 7 indicates a coverage area by a BS 3 in the cellular mobile telephone system and a dotted-line circle 8 indicates a coverage area by a FS 5 in the microzone system. Typically, the coverage area by the BS 3 has a radius of several kilometers and the coverage area by the FS 5 has a radius of several tenths of kilometers. Accordingly, the microzone system is installed in crowded areas such as buildings, town and underground district.

When the ML 6 is carried in a car or the like and is moving at a high speed, it accesses the cellular mobile telephone system but when carried by a person and is moving at a low speed in the crowded area, it is allowed to access the microzone through manual or automatic switching. It is herein meant by automatic switching that when departure of the ML 6 from a service area of a system to which this station presently belongs is detected from, for example, a change in received electric wave, this station automatically accesses the other type of system.

The cellular mobile telephone system and the microzone system are so designed as to have in common the same frequency band and the ML 6 can access any one of the systems.

When taking prevention of interference with the cellular mobile system into consideration, the following two expedients may be available for allotment of a radio channel to the microzone system.

(a) The frequency band in common to the two systems is divided into a part for the cellular mobile telephone system and a part for the microzone system under judgement of the enterpriser.

In this case, interference between the two systems does not essentially occur and allotment of a channel can be done with only interference within the system of its own in mind.

(b) The division of frequency band as in the above (a) is not undertaken and a radio channel being used by a base station in the cellular mobile telephone system which is so remote that interference can be avoided is repetitively used for the microzone system.

Figure 3:
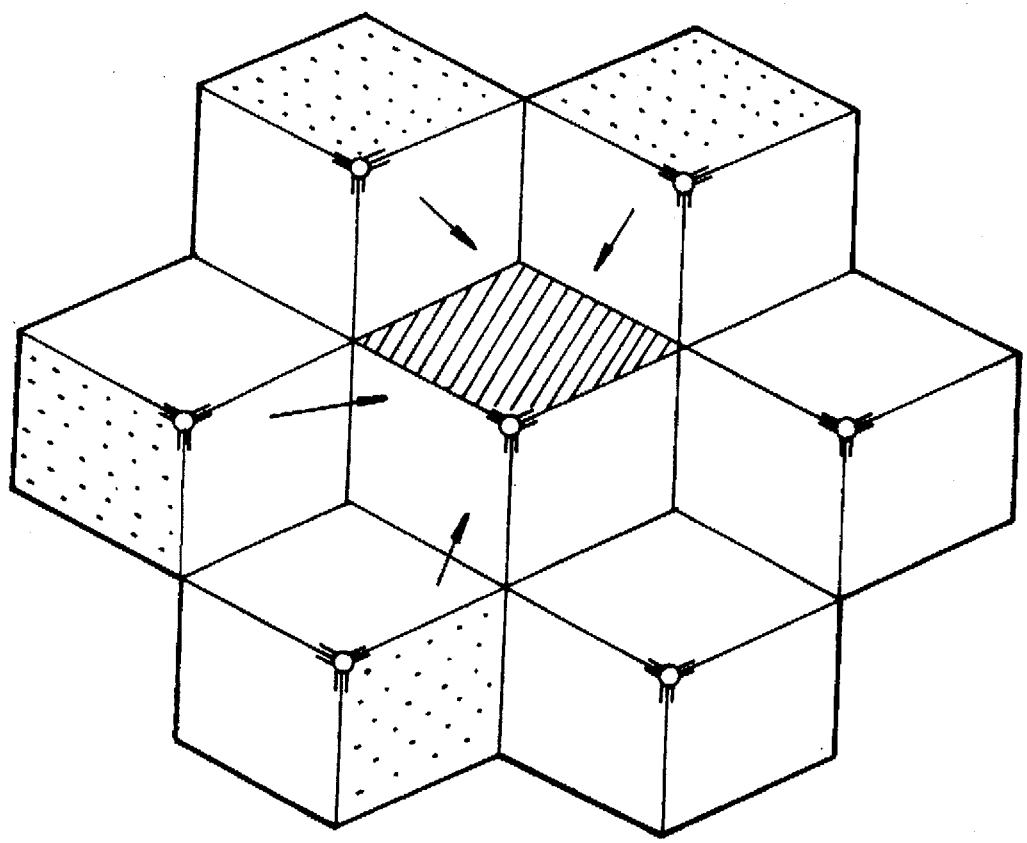
FIG. 3 is a diagram showing the relation of remote cellular mobile telephone system base stations with respect to a microzone system.

FIG. 3 is grounded on the idea in the above (b) to show the relation between a microzone system and remote cellular mobile telephone system base stations on the assumption that the cellular mobile telephone system uses 21 zones of 7 cells×3 sectors as one cluster.

FIG. 3 demonstrates that when the microzone system is assumed to lie in a hatched zone, there is a possibility that cellular mobile system radio channels in 4 dotted zones can repetitively be used for the microzone system from the standpoint of interference distance.

In actual circumstances, however, depending on differences in transmission output and propagation conditions, the repetitive utilization may sometimes be allowed many times but may not sometimes be allowed so many times.

Upon allotment of radio channels to the FS 5 in the microzone system, a radio channel can be allotted fixedly to each FS 5 by calculating and actually measuring propagation conditions as in the case of the cellular mobile telephone system. In this case, employment of a "dynamic allotment method" in which idle one of usable channels is allotted in good time is preferable to employment of a "fixed allotment method" for the following reasons:

2-1 Circumstances of structures in the neighborhood of building, town and underground district are liable to change and therefore mutual propagation conditions between cellular mobile telephone systems are also changeable.

2-2 In the cellular mobile telephone system, there is also a possibility that conditions of location of the system change depending on, for example, cell split.

2-3 Propagation conditions in the microzone system are liable to change in building, town and underground district and design for station installation of FS 5 faces difficulties.

2-4 It should be taken into consideration that installation or removal of the FS 5 can be undertaken flexibly in accordance with an increase or decrease in traffic.

Accordingly, the construction of the microzone mobile communication system and method of operation is specified as follows.

3-1 In the microzone system, one or more receivers MR 9 for cellular monitoring are provided.

Figure 4:
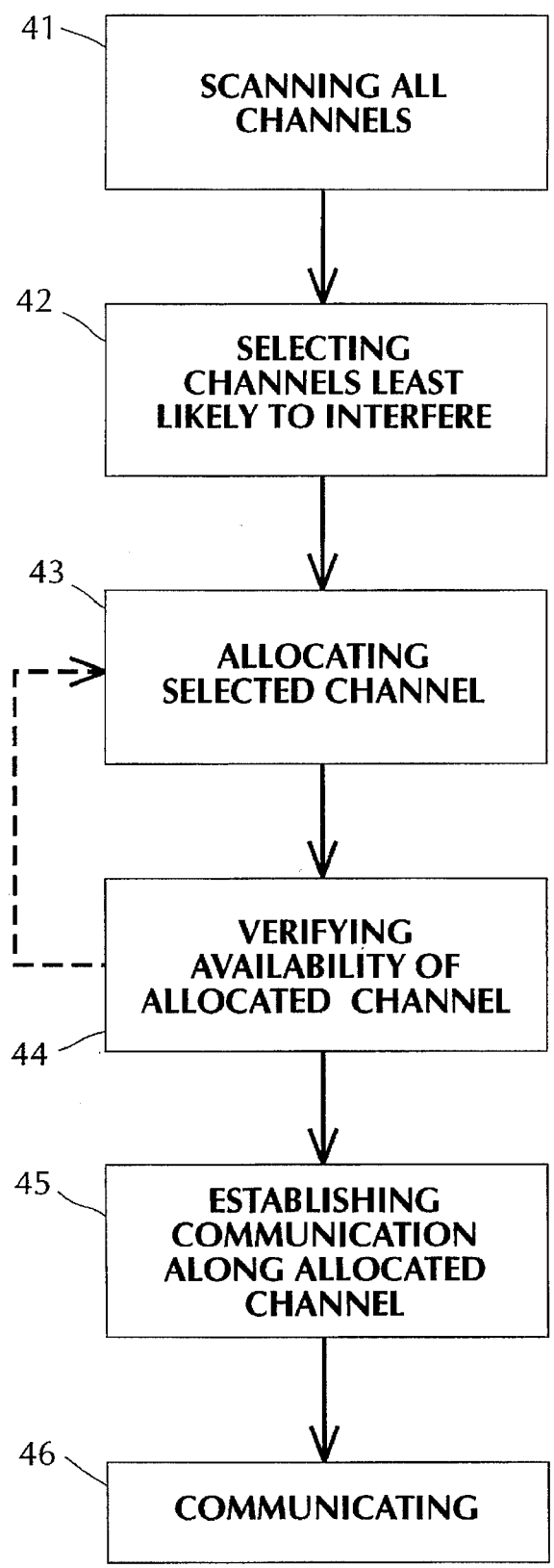
FIG. 4 provides a representative flow chart for the inventive method for communicating in the microzone system.

3-2 This cellular monitoring receiver MR 9 always scans (block 41 of FIG. 4) all of the control channels and the speech channels in the cellular mobile telephone system to monitor them and the CU 4, based on resulting information, discriminates neighboring BS's 3 liable to cause interference from neighboring BS's not liable to cause interference.

3-3 Prior to communication, the CU 4 selects an idle channel from channels which are less apt to interfere (block 42 of FIG. 4) and allots (block 43 of FIG. 4) the selected channel to the FS 5.

3-4 When allotted with the channel selected by the CU 4, the FS 5 verifies in advance of communication that the allotted channel is not used in the cellular mobile system (block 44 of FIG. 4) and thereafter performs setting of a line (block 45 of FIG. 4) to the ML 6.

3-5 In the event that the FS 5 detects interference with the cellular mobile telephone system in above 3-4, the FS 5 informs the CU 4 of this fact to cause the CU 4 to allot a new channel to the FS 5. On the other hand, the CU 4 inhibits allotment of the channel "subject to interference" to the FS 5 and ML 6 for a while.

3-6 Even after communication is once established, the channel may be changed when the cellular monitoring receiver MR 9. FS 5 or ML 6 detects interference with the cellular mobile telephone system. The CU 4 stores the information to reflect it on the succeeding channel allotment.

For avoidance of interference with the cellular mobile telephone system, a full-automated system may be used which orders about, for example, the cellular monitoring receiver MR 9 as described above but alternatively a semi-automated system may be used in which the communication enterpriser transfers information of radio channels being used by neighboring BS's 3 to the CU 4 and channel allotment is carried out by the CU 4 on the basis of the transferred information.

As described above, since according to the invention, the mobile terminal is provided which, when entering an area of a cellular mobile telephone system, accesses this cellular mobile telephone system through manual or automatic switching thereto and, when entering an area of a microzone system, accesses this microzone system through manual or automatic switching thereto, the usable frequency band of the microzone system can be expanded to an extent comparable to that of the cellular mobile telephone system to attain advantages that the number of mobile terminals to be accommodated can be increased and the area in which mobile terminals can receive services can be expanded with flexibility and ease.

The invention has been described by referring to the embodiment using the cellular mobile telephone system but it may also be for use with an ordinary cellular telephone system.

If the FS 5 has the ability to perform self-control judgement of the function of channel allotment, then the CU 4 may be omitted and the FS 5 may be coupled directly to the PSTN 1.

What is claimed is:

1. A microzone mobile communication system which operates in local areas on cellular channels in the same frequency band as a cellular telephone system which is available in said local areas, said microzone mobile communication system comprising:

a plurality of fixed stations for providing communications links for said microzone system;

a cellular monitoring receiver located within one of said local areas for scanning channels of said cellular telephone system, and for monitoring the interference potential of each of said scanned channels;

a control unit for coupling at least one of said fixed stations to a public service telephone network, said control unit being responsive to said monitoring for allocating cellular channels prior to a communication request to said microzone mobile communication system based on said monitoring of said interference potential; and a portable terminal which accesses said microzone mobile communication system on one of said allocated cellular channels in response to a communication request when said portable terminal is within said local area.

2. The microzone mobile communication system of claim 1 wherein said allocated cellular channels are cellular channels which are less apt to interfere in said local area with said cellular telephone system.

3. The microzone mobile communication system of claim 1 wherein said allocated cellular channels are idle channels.

4. The microzone mobile communication system of claim 1 wherein said control unit further selects an idle channel of said allocated cellular channels for use by said microzone communication system in response to a communication request.

5. The microzone mobile communication system of claim 4, wherein said fixed station verifies that said selected cellular channel is idle.

6. The microzone mobile communication system in accordance with claim 1 wherein said cellular monitoring receiver monitors signal strength of said cellular channels and wherein said control unit allocates those cellular channels having a low signal strength in said local area to said microzone mobile communication system.

7. A method for communicating in a microzone mobile communication system which operates in a local area and utilizes channels within the same frequency band as those of a cellular telephone system which is available in said local area, comprising the steps of:

scanning the channels of said cellular telephone system with a cellular monitoring receiver located within said local area and included in said microzone mobile communication system;

monitoring each of said scanned channels for potential interference;

identifying channels whose use in said local area is less apt to interfere with channels used by said cellular telephone system based on said monitoring of potential interference;

allocating, prior to a communication request, said identified channels to said microzone mobile communication system;

selecting one or more idle channels from said allocated channels in response to a communication request; and communicating on said microzone mobile communication system using said one or more selected channels.

* * * * *